(12) United States Patent
Hostetter et al.

(10) Patent No.: US 7,117,507 B2
(45) Date of Patent: Oct. 3, 2006

(54) SOFTWARE ATOMIZATION

(75) Inventors: Mathew J. Hostetter, Cambridge, MA (US); Benjamin R. Harrison, Somerville, MA (US)

(73) Assignee: Sumisho Computer Systems Corporation, Tokyo (JP)

( * ) Notice: Subject to any disclaimer, the term of this patent is extended or adjusted under 35 U.S.C. 154(b) by 669 days.

(21) Appl. No.: 10/161,964

(22) Filed: Jun. 3, 2002

(65) Prior Publication Data

US 2003/0225921 A1 Dec. 4, 2003

(51) Int. Cl.
*G06F 9/46* (2006.01)
*G06F 9/44* (2006.01)

(52) U.S. Cl. .................. 719/331; 717/128; 717/129; 717/130; 717/131; 712/208; 707/103

(58) Field of Classification Search ........ 719/331–332; 717/110–159, 128–131; 707/4, 103; 712/208
See application file for complete search history.

(56) References Cited

U.S. PATENT DOCUMENTS

| | | | | |
|---|---|---|---|---|
| 4,246,638 | A * | 1/1981 | Thomas | 712/208 |
| 5,291,601 | A | 3/1994 | Sands | |
| 5,586,020 | A * | 12/1996 | Isozaki | 717/159 |
| 5,708,811 | A * | 1/1998 | Arendt et al. | 717/163 |
| 5,802,367 | A * | 9/1998 | Held et al. | 719/332 |
| 5,832,520 | A | 11/1998 | Miller | |
| 6,112,025 | A * | 8/2000 | Mulchandani et al. | 719/331 |
| 6,230,316 | B1 | 5/2001 | Nachenberg | |
| 6,243,859 | B1 * | 6/2001 | Chen-Kuang | 717/111 |
| 6,317,753 | B1 | 11/2001 | McGrath et al. | |
| 6,421,667 | B1 * | 7/2002 | Codd et al. | 707/4 |
| 6,421,827 | B1 | 7/2002 | Dimpsey et al. | |
| 6,564,219 | B1 | 5/2003 | Lee et al. | |
| 6,564,223 | B1 * | 5/2003 | Sexton et al. | 707/103 Y |
| 6,601,114 | B1 * | 7/2003 | Bracha et al. | 719/332 |
| 6,691,305 | B1 * | 2/2004 | Henkel et al. | 717/136 |
| 6,763,397 | B1 * | 7/2004 | Bracha et al. | 719/332 |
| 6,971,089 | B1 * | 11/2005 | Bates et al. | 717/131 |
| 7,047,521 | B1 * | 5/2006 | Bunnell | 717/130 |
| 2002/0073398 | A1 * | 6/2002 | Tinker | 717/110 |

(Continued)

FOREIGN PATENT DOCUMENTS

EP 0 717 353 A2 6/1996

OTHER PUBLICATIONS

Liang et al., "Dynamic Class Loading in the Java Virtual Machine", 1998, ACM, pp. 36-44.*

(Continued)

*Primary Examiner*—Meng-Ai An
*Assistant Examiner*—Jennifer N. To
(74) *Attorney, Agent, or Firm*—Finnegan, Henderson, Farabow, Garrett & Dunner LLP

(57) ABSTRACT

Software atomization provides a method of loading atomized computer program code and data on demand by loading, from an atom database, into a memory, an atom defining code or data in a fine-grained, individually addressable manner. Atoms comprise an atom identifier, computer program code or data information and computer program code or data reference information. The computer program code or data information is modified by transforming the reference information into memory addresses. The present invention provides for the lazy loading of data both implicitly and explicitly. Data is lazily loaded implicitly when it is referenced from code that is lazily loaded. Data is lazily loaded explicitly by encoding a referencing atom identifier such that the referenced data atom is not loaded until actually accessed at runtime.

20 Claims, 10 Drawing Sheets

U.S. PATENT DOCUMENTS

| | | | |
|---|---|---|---|
| 2002/0143764 | A1 | 10/2002 | Martin et al. |
| 2002/0199172 | A1* | 12/2002 | Bunnell .................. 717/128 |
| 2003/0028862 | A1* | 2/2003 | Bates et al. ............... 717/129 |
| 2003/0233491 | A1* | 12/2003 | Bracha et al. ............ 709/331 |
| 2003/0236794 | A1 | 12/2003 | Hostetter et al. |
| 2004/0015923 | A1* | 1/2004 | Hemsing et al. .......... 717/154 |
| 2004/0177360 | A1* | 9/2004 | Beisiegel et al. ......... 719/316 |

OTHER PUBLICATIONS

Sabatella, "Lazy Evaluation of C++ Static Constructors", 1992, ACM Sigplan Notices, vols. 27, No. 6, pp. 29-36.*

Qian et al., "A Formal Specification of Java Class Loading", 2000, ACM, pp. 325-336.*

International Search Report (International Application No. PCT/US 03/17561) mailed Jun. 3, 2005.

Author Unknown, "Transparent Dynamic Subroutine Loader," IBM Technical Disclosure Bulletin, May 1986, vol. 28, No. 12.

Ho, W. Wilson, et al.; "An Approach to Genuine Dynamic Linking," Software Practice and Experience, Apr. 1991, vol. 21, No. 4, Chichester, Sussex, Great Britain.

Fong, Philip, W. L. et al.; "Proof Linking: An Architecture for Modular Verification of Dynamically-Linked Mobile Code," BNSDOCID XP-000831185, 1998.

Sirer, Emin Gün, et al.; "A Practical Approach for Improving Startup Latency in Java Applications," VNSDOCIS: XP-001188167A, Feb. 26, 1999.

* cited by examiner

Fig. 12 atom-offset-sequence 390
- first-atom-file-offset 392
- delta-coded-file-offset-array 394

Fig. 13 encoded-atom 395
- atom-flags 396
- atom-num-info 397
- encoded-atom-references 398
- encoded-raw-atom-bytes 399

Fig. 14 encoded-atom-reference 398
- atom-ref-type 402
- source-offset-delta 404
- dest-offset 406
- dest-atom-id 408

Fig. 9 atom database 120
- DB-header 350
- atom-map 360
- atom-map 360
- ...

Fig. 10 atom-map-header 370
- default-atom-sequence-delta 372
- atom-offset-sequence-array size 374
- atom-offset-sequence-array-offset 376
- atom-map-data-offset 378

Fig. 11 atom-map-array 380
- first-id 382
- sequence-size 384
- sequence-offset 386
- first-id 382
- sequence-size 384
- sequence-offset 386
- ...

SOFTWARE ATOMIZATION

BACKGROUND OF THE INVENTION

Computer software is generally created for interpreted language systems or compiled language systems. Interpreted language systems translate high-level program statements into executable form and execute one statement at a time rather than completely translating (i.e., compiling) the high-level statements before execution. Basic, LISP and APL are generally implemented as interpreted languages. Compiled language systems translate high-level program statements into an intermediate, object code, format prior to execution. In compiled language systems program statements are written in a source code programming language (e.g., C, C++). Source code contains human-readable program statements written in a high-level or assembly language that is not directly executable by a computer. The source code is processed by a compiler which transforms the source code into object code (e.g., .OBJ files) by following a set of syntactic and semantic rules. The object code is then linked together using a linker to produce an executable computer program (e.g., an .EXE file).

Executable computer programs can be very large in size, both as stored on disk and when loaded into computer memory. Dynamic link libraries ("DLL") provide a mechanism to store executable routines and data separate from the main executable computer program. The executable routines can be loaded only when needed by the executable computer program. DLLs conserve space by only using memory when a routine or data is used. DLLs also provide for organization and management of computer code and data separate from the executable computer program and also separate from other DLLs. This allows a programmer to make corrections or improvements to only certain routines in a DLL without affecting the operation of the calling computer program or any other DLL. Additionally, DLLs can be shared among multiple computer programs. DLLs themselves can be quite large and multiple executable routines are often organized into a single module within the DLL, making the DLL not very granular in terms of its downloading, updating and loading.

Techniques exist for minimizing the transfer time associated with updating large DLLs or other code/data. File transfer protocols using a difference detection algorithm (e.g., rsync) can reduce transfer time. These algorithms can arrange source and target files into blocks of data, analyze the blocks, and only transfer the blocks that are not identical between the source and target files.

Compression can also be used to reduce transfer time of code and data both over communications media as well as from disk to memory. Embedded processor systems, which are especially sensitive to executable code size, have been implemented that implement compression for executable code. A compressed "wire" representation of code can be used, but the code must be decompressed before execution. Other techniques provide for direct execution of compressed code (e.g., "byte-coded RISC" or "BRISC" virtual machines).

The Curl™ language combines layout, scripting and programming capabilities in one integrated environment. By pairing this fully featured language with client side execution, Curl™ technology delivers fast, efficient, highly functional applications over the Web, and enables interactive Web services capabilities in which the client and server can interoperate. Curl™ content is displayed using a Web browser augmented with a Curl™ plug-in and a Curl™ runtime environment. The Curl™ runtime environment is atypical of many runtime environments in that it is compiled from approximately equal amounts of code and data. The Curl™ runtime environment is implemented using a large number of DLLs.

SUMMARY OF THE INVENTION

Implementing computer systems using conventional techniques (e.g., EXEs and DLLS) presents many problems. These computer systems exhibit poor startup time, use too much memory and are cumbersome to update due to their use of large-grained executable routines and data. A fine-grained method to organize and manage executable computer software and data using software atomization to create and execute software atoms is provided.

Atoms are code snippets or data elements which are uniquely identified by an atom id (identifier). Code atoms are typically on the order of a source language (e.g., C/C++) procedure. Data atoms are data elements and can be of any size. An atom is pulled into memory when needed and can be swapped out when no longer needed.

A method provides for loading atomized computer program code and data on demand by loading, from an atom database, into a memory, an atom defining code or data in a fine-grained, individually addressable manner. Atoms comprise an atom identifier, computer program code or data information and computer program code or data reference information. The computer program code or data information loading is completed by transforming each reference into an appropriate address and inserting the address it into the body of the atom at the appropriate offset.

Lazy, or load on demand, loading of code is provided by transforming an atom identifier based reference into a memory address of a stub routine. The stub routine loads the referenced atom and jumps to it. The loading type of an atom can be altered by modifying the computer program code or data reference information to effect an eager or lazy loading technique. The loading type of an atom can be determined based upon analyzing a runtime pattern of previous atom loading experiences. When loaded, an atom can be shared between a plurality of executable processes by way of a read-only buffer.

A "back-patching" technique can be applied to all atoms that reference the target atom through the stub. An atom reference is defined by a source offset within the calling routine where the call is made, a destination atom id for the called atom and a destination offset within the called atom. Once a stub routine loads its target atom, the memory address of the stub routine can be overwritten by the memory address of the referenced atom.

Lazy, or load on demand, loading of data is provided implicitly by providing lazy loading of code and explicitly by encoding a referencing atom identifier such that the referenced data atom is not loaded until actually accessed at runtime. Since the loading of code that references data can be delayed until invoked, the data that the code references is likewise delayed—providing implicitly lazy loading of the data. Explicitly lazy data typically requires programmer support in order to mark the data to be lazily loaded (e.g., using compiler directives). In one embodiment, explicitly lazy data is referenced using a specific encoding algorithm that multiplies the referencing atom identifier by two and the increments the referencing atom identifier by one to produce a lazy data atom identifier.

In other embodiments of the present invention, optimizations are provided by the atom management program. Reordering of atoms in a disk-based atom database for efficient access can be done based upon analyzing a runtime pattern of previous atom loading experiences. The computer program code or data information can be stored in a compressed format. The compression can reduce the load time of atoms as well as reduce the disk space required to store atoms. Memory can be conserved by garbage collecting, whereby loaded atoms are removed from memory based upon a predetermined usage threshold. Execution of a loaded atom can begin prior to loading all atoms referenced by the loaded atom to provide a streaming execution environment.

Updating some of the atoms in an atom database can be done by replacing the computer program code or data information and the computer program code or data reference information.

Code and data atoms can be created from programming language objects (e.g., .obj files) using an extractor. Atoms can also be created using any other process that produces an atom capable of being processed by the atom management program. In one embodiment of the present invention, a method for atomizing computer program code and data comprises receiving the computer program code and data in an object code format defining individually addressable code and data and extracting computer program code and data information from the computer program code and data stored in an object code format. Computer program code and data reference information is also extracted from the computer program code and data stored in the object code format. The computer program code and data reference information is modified to use atom identifiers and stored in an atom comprising: an atom identifier, computer program code or data information, and computer program code or data reference information.

In one embodiment of the present invention a memory for storing data for access by a computer program being executed on a data processing system is defined, the memory can store atoms defined by a data structure. The data structure comprises a header and an atom map. The atom map comprises an atom map header and an atom map array. The atom map array comprises atom offset sequences, the atom offset sequences referencing atoms comprising: an atom identifier, computer program code and/or data information; and computer program code and/or data reference information. Atom maps can also provide a mapping of atom identifiers to symbolic names.

Embodiments of the present invention provide faster computer program start times, smaller executable code (e.g., plug-in, runtime) downloads, smaller disk footprint, smaller memory footprint and much smaller update files as the code and data are handled at the atomic (addressable) unit level. This fine-grained approach of atoms provides for loading exactly the code and data needed, and not loading other code and data simply because it is located nearby in an executable file. Atomization provides for optimization for random access for code and data based upon the fine-grained, individually addressable units that atom create. Because the code and data is atomized into fine-grained, individually addressable units they tend to be small and therefore easier to patch later if updates are needed.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 9 is a diagram of an atom database data structure.

FIG. 10 is a diagram of an atom map header data structure.

FIG. 11 is a diagram of an atom map array data structure.

FIG. 12 is a diagram of an atom offset sequence data structure.

FIG. 13 is a diagram of an encoded atom data structure.

FIG. 14 is a diagram of an encoded atom reference data structure.

DETAILED DESCRIPTION OF THE INVENTION

A description of preferred embodiments of the invention follows. The preferred embodiments are suitable for atomizing a computer program implementing the Curl™ runtime environment executing appropriate parts of the atomized Curl™ runtime to process software written in the Curl™ language, scripts or non-Curl programs.

Figure 1:
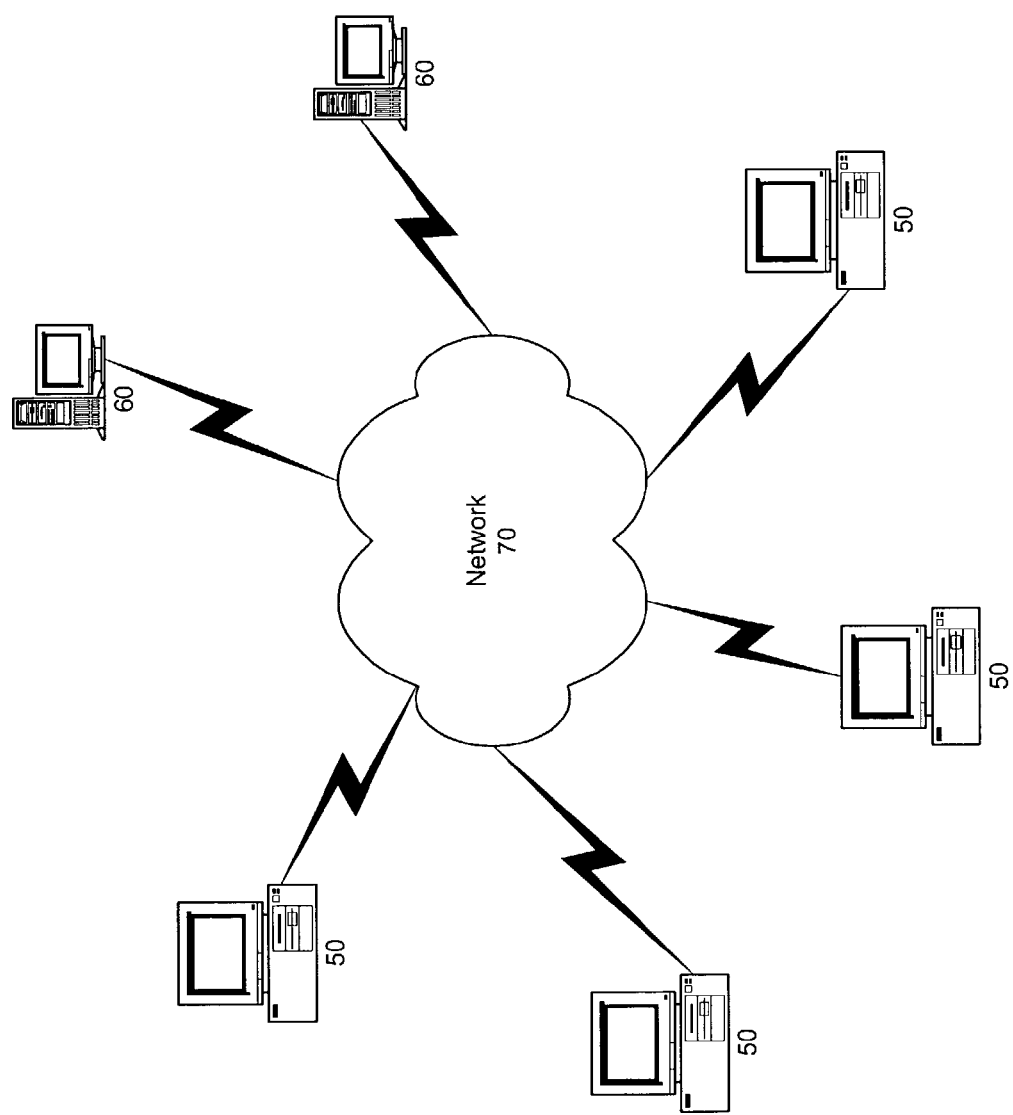
FIG. 1 is a diagram of a computer system on which an embodiment of the present invention is implemented.

FIG. 1 is a diagram of a computer system on which an embodiment of the present invention is implemented. Client computer 50 and server computer 60 provide processing, storage, and input/output devices for atomizing and executing atomized computer programs. The client computers 50 can also be linked through a communications network 70 to other computing devices, including other client computers 50 and server computers 60. The communications network 70 can be part of the Internet, a worldwide collection of computers, networks and gateways that currently use the TCP/IP suite of protocols to communicate with one another. The Internet provides a backbone of high-speed data communication lines between major nodes or host computers, consisting of thousands of commercial, government, educational, and other computer networks, that route data and messages. In another embodiment of the present invention, the processing, storage, and input/output devices for atomizing and execution of atomized computer programs can be implemented on a stand-alone computer.

Figure 2:
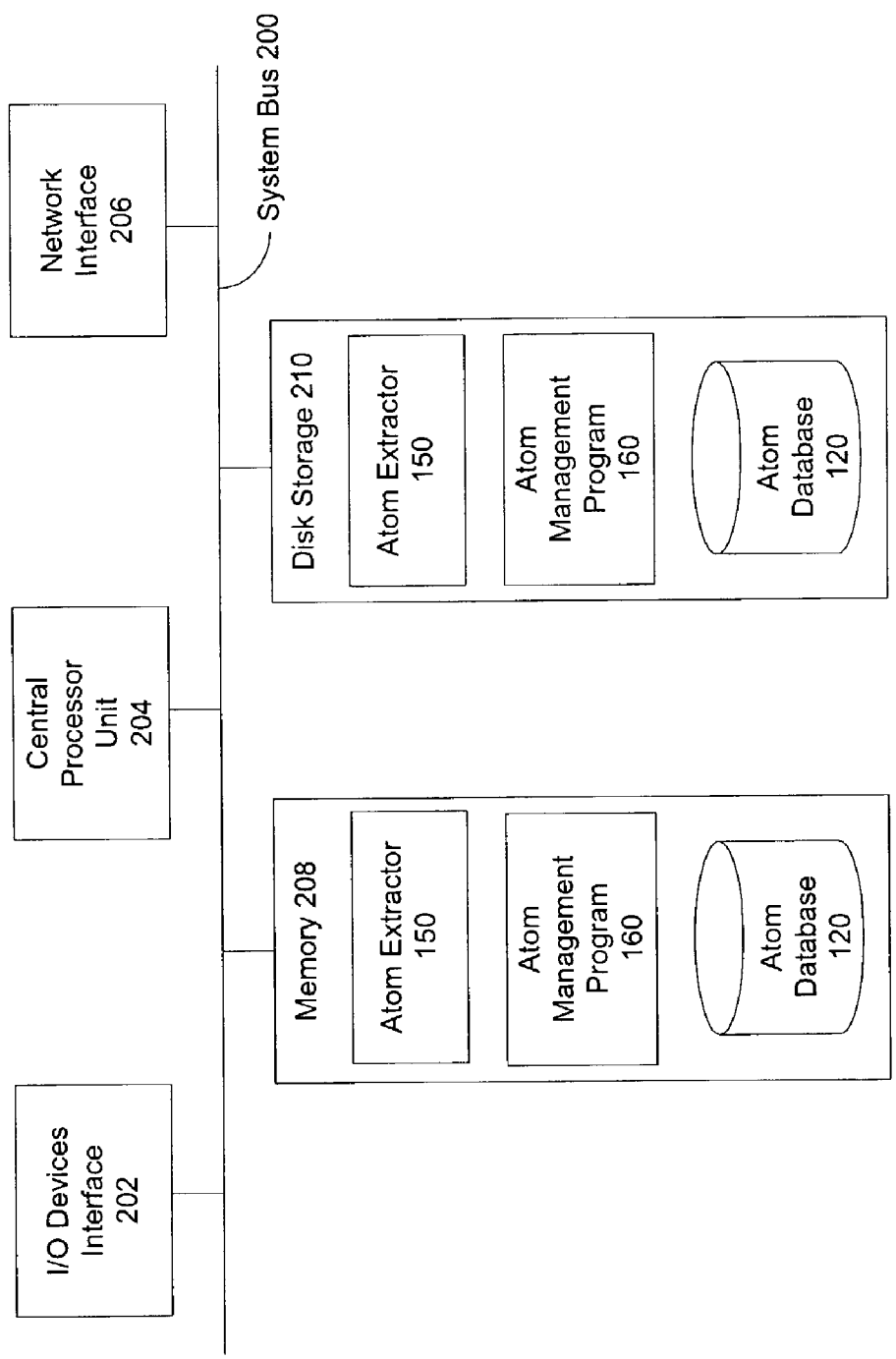
FIG. 2 is a diagram of the internal structure of a computer in the computer system of FIG. 1.

FIG. 2 is a diagram of the internal structure of a computer (e.g., 50, 60) in the computer system of FIG. 1. Each computer contains a system bus 200, where a bus is a set of hardware lines used for data transfer among the components of a computer. A bus 200 is essentially a shared conduit that connects different elements of a computer system (e.g., processor, disk storage, memory, input/output ports, network ports, etc.) that enables the transfer of information between the elements. Attached to system bus 200 is an I/O device interface 202 for connecting various input and output devices (e.g., displays, printers, speakers, etc.) to the computer. A network interface 206 allows the computer to connect to various other devices attached to a network (e.g., network 70). A memory 208 provides volatile storage for computer software instructions (e.g., atom extractor program 150 and atom management program 160) and data structures (e.g., atom database 120) used to implement an embodiment of the present invention. Disk storage 210 provides non-volatile storage for computer software instructions (e.g., atom extractor program 150 and atom management program 160) and data structures (e.g., atom database 120) used to implement an embodiment of the present invention.

A central processor unit 204 is also attached to the system bus 700 and provides for the execution of computer instructions (e.g., atom extractor program 150 and atom management program 160), thus allowing the computer to atomize and execute atomized computer programs.

Figure 3:
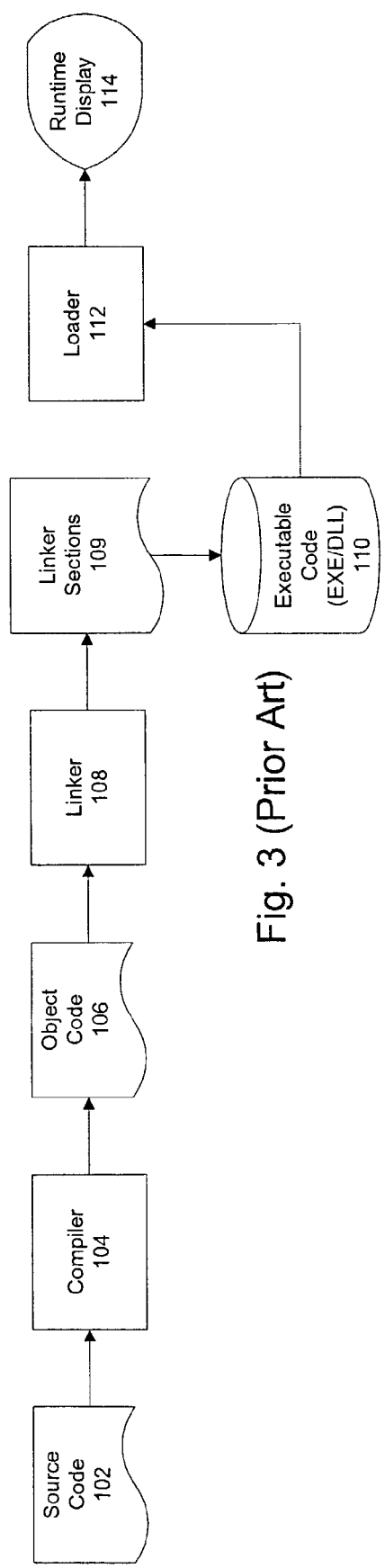
FIG. 3 illustrates a conventional process for creating and loading a computer program to display output at runtime.

FIG. 3 illustrates a conventional process for creating and loading a computer program to display output at runtime. Source code 102 is produced by a computer programmer using a source code programming language (e.g., C, C++). A compiler 104 processes the source code and produces object code 106 files. One or more object code 106 files are linked, using linker 108 to produce linker sections 109. The linker sections 109 are combined to produce executable code 110. Executable code 110 can be linked as standalone executable programs (e.g., .EXE files) or as shared libraries of code (e.g., .DLL files). The executable code 110 is loaded into memory by a loader 112 for execution in order to produce a runtime display 114.

Figure 4:
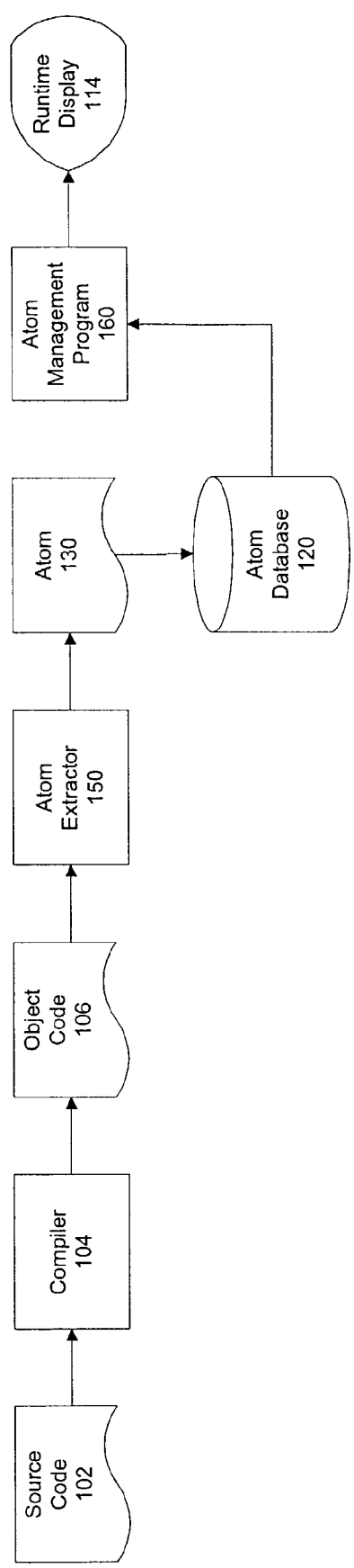
FIG. 4 illustrates a software atomization process for creating and loading an atomized computer program to display output at runtime.

FIG. 4 illustrates a software atomization process for creating and loading an atomized computer program to display output at runtime. As with the conventional process, source code 102 is produced by a computer programmer using a source code programming language (e.g., C, C++). A compiler 104 processes the source code and produces object code 106 files. After source code 102 has been compiled into object code 106 files in the usual manner, the atom extractor 150 processes the object code 106 files to identify the atoms 130. The fine-grained, individually addressable atoms 130 are placed into an atom database 120, with each atom 130 receiving a unique atom id 132. Fine-grained atoms 130 provide for the definition of code and data of any integral number of bytes. References to code and data are converted into atom id references. For example, procedure calls within the code are converted to invocations of other atoms 130 via their atom ids 132. Data references are also converted to data atom references via their atom ids 132.

The atom extractor 150 walks over the object code files 106 and creates atoms 130 from the code. Information needed to extract atoms 130 from the object code 106 is already embodied in the object files, by virtue of the fact that a conventional loader needs the same information in order to load and invoke procedures and optimize read-only data. Information needed to extract multiple data atoms from object code files 106 requires separation of various data quantities. The separation can be done automatically by some conventional compilers (e.g., gcc), or explicitly by a programmer marking data quantities directly in the source code (e.g., compiler directives). At runtime an atom management program 160 accesses atoms 130 from atom database 120 and loads them into memory for execution. The loaded atoms 130 can then produce a runtime display 114, or any other result for which they are programmed, when executed. The atom management program 160 can determine an optimal order for loading atoms 130 based on static code analysis or dynamic profiling. By relying on the compiler to create separate sections within object code files 106 the process of atomization can be made automatic, avoiding the need for manual decomposition and analysis. Use of a compiler provides one option for the creation of separate sections of code and data, alternatively other programs can be used to process source files to produce atoms 130.

Figure 5:
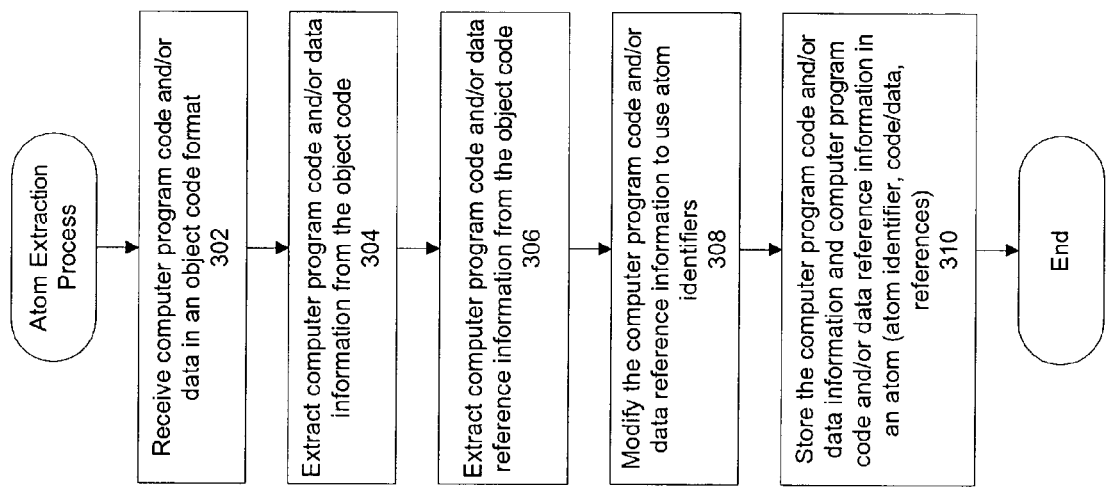
FIG. 5 illustrates an atom extraction process.

FIG. 5 illustrates an atom extraction process. At step 302 computer program code and/or data is received in an object code format. At step 304 computer program code and/or data information is extracted from the computer program code and/or data in an object code format. At step 306 computer program code and/or data reference information is extracted from the computer program code and/or data in an object code format. At step 308 the computer program code and/or data reference information is modified to use atom identifiers. Finally, at step 310 the computer program code and/or data information and computer program code and/or data reference information is stored in an atom comprising: an atom identifier; computer program code and/or data information; and computer program code and/or data reference information.

Figure 6:
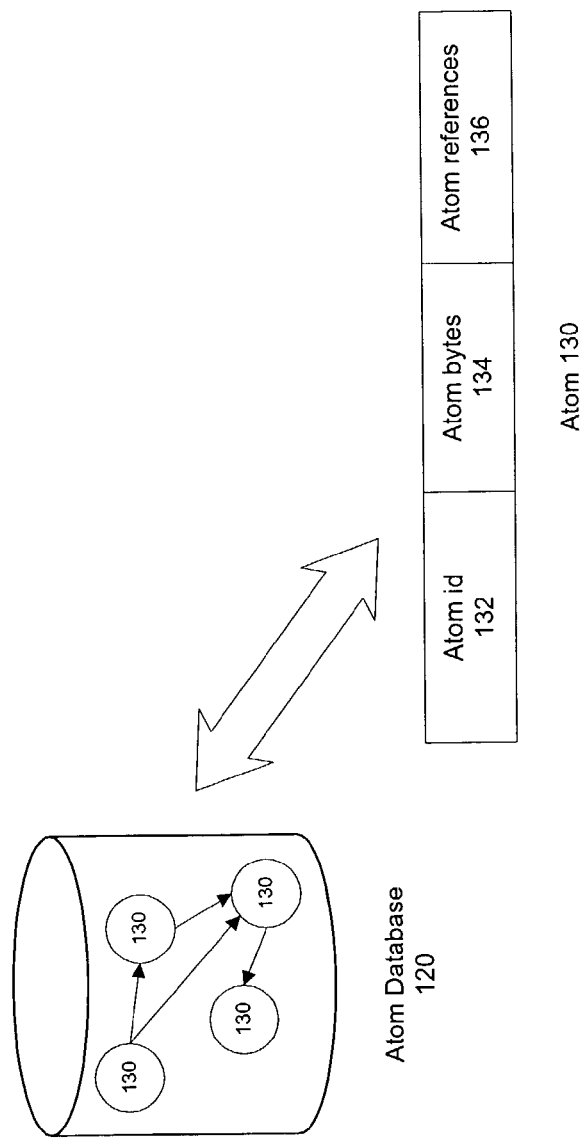
FIG. 6 is a diagram of an atom database and an atom.

FIG. 6 is a diagram of an atom database and an atom. Conceptually, atom database 120 can be viewed as a directed graph of atoms 130. Atom bytes 134 (node) are identified by atom id 132 (node id) and linked by atom references 136 (edges). Atom database 120 stores atoms 130. Each atom 130 is identified by a unique atom id 132. The code and/or data for each atom 130 is represented as atom bytes 134. The atoms 130 can be compressed, including the code and/or data within the atom bytes 134 and the atom references 136. In certain environments decompression is faster than disk-read time and the compression and decompression process provides significant performance improvements as well as reduced memory and disk storage space.

Figure 7:
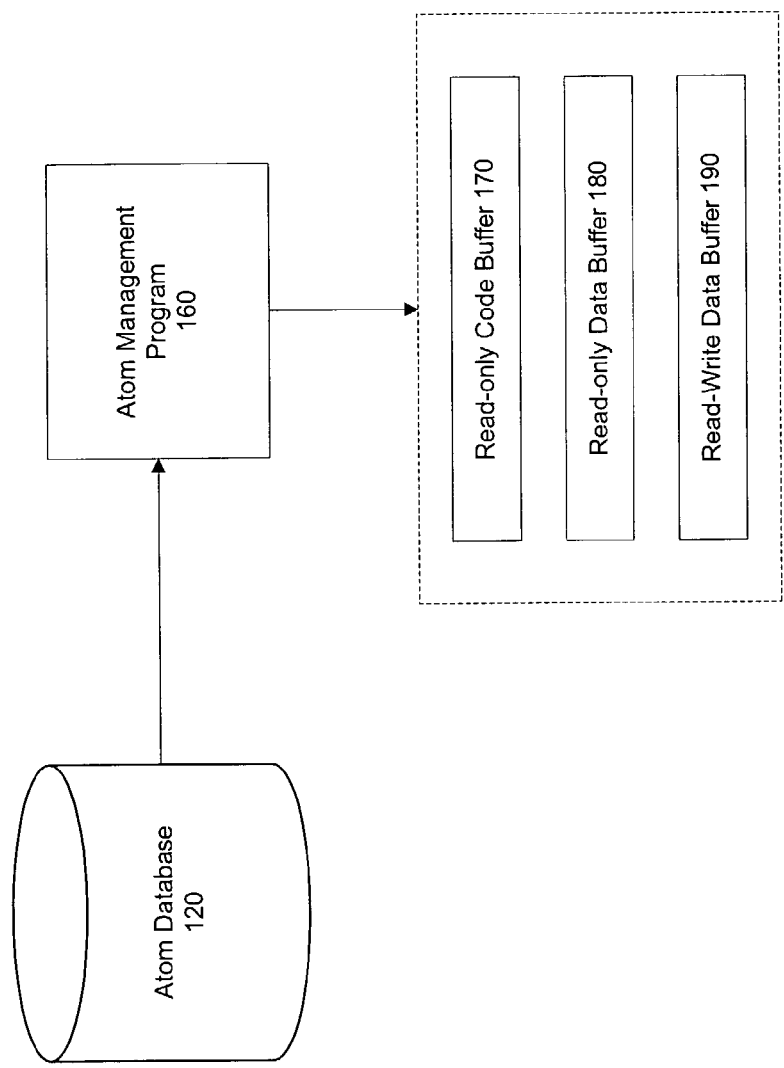
FIG. 7 is a diagram of an atom management program.

FIG. 7 is a diagram of an atom management program. At runtime, an embodiment of the present invention bypasses the conventional mechanism for loading shared libraries (i.e., DLLs), instead using the more efficient atom mechanism which loads at the granularity of atoms 130 instead of, for example, 4K blocks of memory. The atom management program 160 loads atoms 130 from the atom database 120 as needed. The atom management program 160 allocates host memory and then manages atoms 130 within buffers. The atom extractor 150 has previously modified procedure calls to be indirect through atoms 130 for the atom management program 160, which locates existing atoms 130 in memory or loads them from the atom database 120 if they are not already loaded.

The buffer management offers several benefits, including: bounded memory usage, reduced host swapping and thrashing and reduced startup times. Bounded memory usage bounds memory usage to any specific size. For example, we could choose to have exactly 8MB of memory for code atoms 130, and swap out older atoms 130 when newer ones are required. Embodiments of the present invention reduce host swapping and thrashing by limiting memory usage, therefore the host does not need to use its memory management mechanisms to manage excessive use of memory. The host's memory management is inherently less efficient since it is general purpose and not tuned to specific needs. By loading exactly the code needed, and not necessarily loading other code simply because it is "nearby" in a shared library, memory consumption is reduced. The atom management program 160 reduces startup times. The atom management program 160 will load and execute a first atom 130. As new atoms 130 are needed, they are loaded and executed. Therefore, code is executing right away, without waiting for the entire code set to be loaded into memory. Embodiments of the present invention begin to execute code atoms 130 which are being downloaded before the download has completed (limited by the availability of atoms 130 which may not have been transmitted yet).

Atom management program 160 manages three buffers: read-only code buffer 170, read-only data buffer 180 (e.g., constants) and read-write data buffer 190 (e.g., global data). Since the read-write data could be of arbitrary size, and may not be able to be reloaded from the atom database 120, its size may not be limited, thus the host's virtual memory system may be employed for its management.

Loading the atoms 130 into the buffers one at a time is less efficient than loading a working set of atoms 130 simultaneously if it can be determined that they are related, for example, that they all will be needed "soon". A working set tuner is used to determine which atoms 130 form a "working group". The working set tuner is adapted to collect information for the atomized environment. Once the information is collected, a mechanism is used to take advantage of the information, such as a directive within the atom database 120 which indicates the relationship of atoms 130 to each other. Embodiments of the present invention provide the ability to reorder atoms 130 on disk to match a specific load sequence, thus providing for faster loading.

Through the atom management program's management of the read-only code buffer 170 certain loading optimizations are provided. When one atom 130 makes a procedure call to another atom 130, we generally make this call indirectly, using a stub via the atom management program 160. The procedure call is faster when the in-memory image of the caller's code is modified to make a direct jump ("link snapping") to the target atom 130. However, once the link is snapped, the atom management program 160 can not move or swap out the target atom 130 without invalidating the link. For atoms 130 which are called frequently, this can be a worthwhile tradeoff. Tools are utilized by the atom management program 160 to determine which atoms 130 qualify for direct calling, and for locking atoms 130 into memory. Analysis for link snapping can be done at run-time, by locking down code/data into memory, or at compile-time, by marking certain atom references 136 to not use stubs at run-time.

A plurality of programs can access the same atom database 120 to share code and/or data. If the host processor supports shared memory between host processes, then the read-only code buffer 170 and read-only data buffer 180 can also be shared among host processes.

Figure 8:
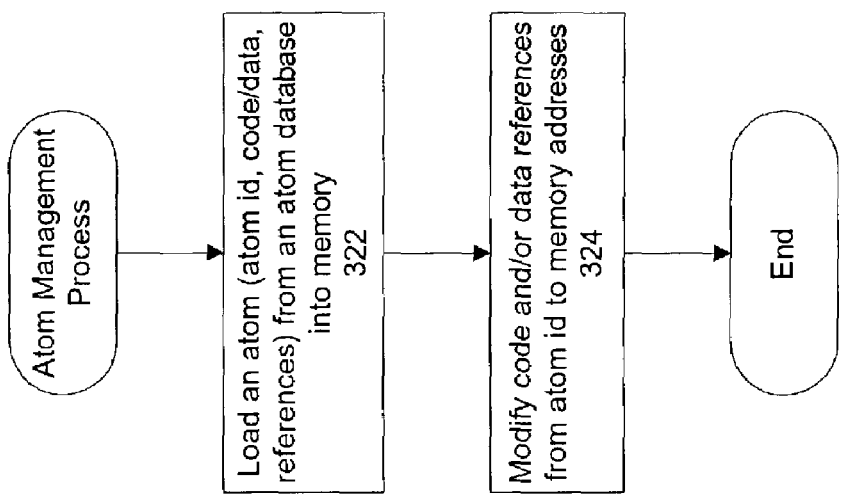
FIG. 8 illustrates an atom management process.

FIG. 8 illustrates an atom management process. At step 322 an atom management process manages atomized computer program code and/or data by loading into memory, from an atom database, an atom comprising: an atom identifier; computer program code and/or data information; and computer program code and/or data reference information. At step 324 the computer program code and/or data reference information is then modified from using atom identifiers and offsets, to using memory addresses.

FIG. 9 is a diagram of an atom database data structure. An atom database 120 stores atoms 130. An atom 130 corresponds to a single datum, such as a compiled procedure or string constant. Atoms 130 are loaded from an atom database 120 into memory when they are needed. This reduces memory footprint and reduces disk I/O. An atom database 120 is a mapping from atom id 132 values (integers) to atoms 130. An atom id 132 can be represented as a 31-bit integer that identifies an atom 130. Atoms 130 can be loaded in any order. The on-disk representation of the atom database 120 is optimized to conserve space and minimize the I/O needed to load atoms 130 into memory. An atom database 120 also provides a mapping from atom id 132 values to information associated with the relevant atom 130, such as symbols and debugging info.

An atom database 120 is one file consisting of several distinct sections, each of variable size, the sections include a DB-header 350 and atom maps 360. In various embodiments the atom maps 360 can: a body-atom-map, a symbol-atom-map, a category-atom-map and/or a description-atom-map. The db-header 350 must come first, but the order, location and number of the other map sections is arbitrary. The DB-header 350 contains the file offset for each of the other sections. Each section, if present, must appear exactly once.

DB-header 350 is the very first thing in the database file. It contains some global information about the file and the locations of the other sections, including: magic-number, version-number, cpu-type, os-type, body-atom-map-offset, symbol-atom-map-offset, category-atom-map-offset and description-atom-map-offset.

Magic number identifies this file as an atom database 120 and also defines the endianness of all other multibyte numbers in the file. The magic number consists of these four bytes if the database is stored in little endian byte order: 0xD7 0x15 0xFF 0x31. For a big endian file, the bytes are reversed: 0x31 0xFF 0x15 0xD7. This byte sequence has no particular meaning. The database file will always be stored in the native endianness (byte-order) of the processor whose code it contains. This avoids the need for wasteful byte-swapping at runtime. However, the magic number specifies the endianness unambiguously so that cross-platform tools can manipulate atom databases 120.

Version-number indicates the version of file format used by the database.

CPU type indicates the type of CPU for which the database was produced (e.g., Pentium, PowerPC, etc.).

OS-type is the type of the operating system for which this database was produced (e.g., Win32, Linux, MacOS X, etc.).

Body-atom-map-offset is the file offset where the body-atom-map section begins, relative to the beginning of the file.

Symbol-atom-map-offset is the file offset where the symbol-atom-map section begins, relative to the beginning of the file.

Category-atom-map-offset is the file offset where the category-atom-map section begins, relative to the beginning of the file.

Description-atom-map-offset is the file offset where the description-atom-map section begins, relative to the beginning of the file.

FIG. 10 is a diagram of an atom map header data structure. An atom-map 360 contains an atom-map-header 370 and an atom-map-array 380. The atom-map 360 maps an atom id 132 to a file offset where some information related to that atom id 132 can be found. The atom-map 360 representation will work for any set of atom ids 132, but it is optimized for contiguous ranges of atom ids 132, so for example, an atom-map 360 for atom ids 132 {12, 23, 24, 216} will take more space than one for atom ids 132 {10, 11, 12, 13}. An atom-map 360 section begins with an atom-map-header 370 including a default-atom-sequence-delta 372, an atom-offset-sequence-array-size 374, an atom-offset-sequence-array-offset 376 and an atom-map-data-offset 378.

Default-atom-sequence-delta 372 fields can be used in an atom-map 360 which contains sequences of file offsets for data corresponding to consecutive atom ids 132. These sequences are "delta coded" in the atom-map 360 to save space. Delta coding is the technique of storing a sequence of numbers as the difference between successive pairs. For many sequences, the deltas will be small, and because many encoding schemes can store numbers near zero more compactly, the delta sequence will often take less space than the original sequence. For example, the delta-coded version of: {1000, 1011, 1012, 1013, 1015, 1016} would look like: {1000, 1, 1, 1, 2, 1}. The deltas are usually small positive numbers, but they can be brought even closer to zero by subtracting a well-chosen constant, namely, a default-atom-sequence-delta 372, from each one. For example, suppose the original numeric sequence were {1000, 1050, 1104, 1165, 1202}. Delta coding that sequence yields: {1000, 50, 54, 61, 37}. With default-atom-sequence-delta 372 is equal to 50, this sequence would be further adjusted to: {1000, 0, 4, 11, −13}. Since the final numbers are closer to zero, the sequence can be encoded more compactly. Huffman coding or arithmetic coding schemes can also be applied.

Atom-offset-sequence-array-size 374 is the number of entries in the atom-map's 360 array of sequences.

Atom-offset-sequence-array-offset 376 is the file offset of the atom-map's 360 array of sequences, relative to the start of the atom-map 360 section in the database file.

Atom-map-data-offset 378 is the file offset where the data for the atom-map 360 begins, relative to the start of the atom-map 360 section in the atom database 120 file.

An atom-map 360 (e.g., body-atom-map, symbol-atom-map, category-atom-map and description-atom-map) contains an atom-map-array 380. Each atom-map-array 380 element is a reference to a compressed sequence of file offsets (i.e., an atom-offset-sequence 390). Each atom-offset-sequence 390 contains compressed file offsets for the information belonging to a group of consecutive atom ids 132.

FIG. 11 is a diagram of an atom map array data structure. The atom-map-array 380 consists of the elements: first-id 382, sequence-size 384 and sequence-offset 386. The first-id 382 is the atom id 132 of the first atom 130 in the sequence. The sequence-size 384 is the number of atoms 130 in the atom-offset-sequence 390. The atoms 130 in the sequence have consecutive atom ids 132, starting with first-id 382. The sequence-offset 386 is the file offset to the start of atom-offset-sequence 390, relative to the start of the atom-map 360 section of the atom database 120 file. The atom-map-array 380 is sorted by the atom id 132 of the first atom 130 in each sequence. This makes it possible to map an atom id 132 to its containing sequence by doing a binary search. Scanning the containing sequence will then yield the file offset for the desired atom 130.

FIG. 12 is a diagram of an atom offset sequence data structure. The atom-offset-sequence 390 is a delta coded array of file offsets including: a first-atom-file-offset 392 and an array of delta-coded-file-offsets 394. Each file offset is added to the atom-map-data-offset 378, and the result is interpreted relative to the start of the atom-map 360 section. One long sequence takes less space than two smaller sequences containing the same number of file offsets, because it amortizes the fixed overhead per sequence. However, the longer sequence takes longer to search. So atom-maps 360 are typically broken into more sequences than strictly necessary, to put a reasonable bound on their length and hence on the search times. There is, however, no fixed limit to the sequence size.

First-atom-file-offset 392 is the file offset of the first atom 130 in the sequence. The rest of the sequence is a series of deltas, starting with this value.

Delta-coded-file-offset-array 394 is a block of bytes encoding a sequence of file offsets where the data belonging to consecutive atom ids 132 can be found.

To encode a sequence the encoder begins with a sequence of file offsets. These represent byte offsets to be added to the atom-map-data-offset 378. For example, suppose the original file offset sequence were {1000, 1050, 1104, 1165, 1645, 760}. Note that the atoms 130 are not necessarily in order in the file. First, the sequence is delta coded yielding {1000, 50, 54, 61, 480, −885}. If default-atom-sequence-delta 372 is equal to 50, this sequence would be further adjusted to {1000, 0, 4, 11, 430, −935}. Finally, each number in the sequence (after the first, which is stored in first-atom-file-offset 392), is encoded as a variable size integer. The encoding yields the byte sequence {0x00 0x04 0x0B 0x83 0x2E 0xF8 0x59}. Some integers are stored using a variable-size encoding scheme that takes fewer bytes for smaller values. Signed integers are encoded as a sequence of 7-bit values. The values are stored in big-endian byte order (most significant byte first), regardless of the overall endianness of the database. The high bit of each byte is a special flag that indicates whether any further bytes follow. The seventh bit of the first byte (the most significant bit of numeric data) is sign-extended. Unsigned integers are encoded as a sequence of 7-bit values. The values are stored in big-endian byte order (most significant byte first), regardless of the overall endianness of the database. The high bit of each byte is a special flag that indicates whether any further bytes follow. The resulting value is zero-extended.

Atom maps 360 are used to associate information of a specific type with an atom id 132. For example, atom maps 360 can be used for code/data body information, symbol information, category information and description information.

Body-atom-maps map each atom id 132 to a block of information needed to load that atom id 132, including, for normal atoms, compressed information about the atom references 136 and atom bytes 134 which can be combined to form the final normal atom body, and for special-purpose atoms, information appropriate to each sub-type of the special-purpose atom.

The first byte of the block is used to encode a set of atom-flags 396. If the value of the low three bits of the atom-flag 396 does not contain a special-purpose identifier (e.g., three on-bits indicating the value "7"), then the atom 130 is a normal atom, otherwise, it is a special-purpose atom. To speed the loading of normal atom bodies, both the atom references 136 and atom bytes 134 for an atom 130 are stored contiguously in the atom database 120 file. To keep the size of the atom database 120 small, and thus to improve the speed at which it can be loaded, the atom references 136 and atom bytes 134 for a normal atom body are compressed in a variety of ways.

FIG. 13 is a diagram of an encoded atom data structure. The block of information for a normal-atom consists of: atom-flags 396, atom-num-info 397, encoded-atom-references 398, and encoded-raw-atom-bytes 399.

Atom-flags 396 use various bits of the flags byte specify the atom compression type. Embodiments of the present invention support multiple compression types. Other bits of the atom-flags 396 byte specify into which buffer the atom should be loaded (i.e., read-only code buffer, read-only data buffer, read-write data buffer). Still other bits define the log base two of the alignment that the atom 130 requires when loaded (e.g., a value of "3" stored in these bits would cause the atom 130 to be aligned mod 8 bytes when loaded).

Atom-num-info 397 is a block of bytes containing information about how many references will appear in the encoded-atom-references 398 block, and how many raw bytes will be extracted from the encoded-raw-atom-bytes 399 block. That entry will determine both the number of references and the number of raw bytes to extract. Conceptual atom bytes 134 and atom references 136 are encoded as encoded-atom-references 398 and encoded-atom-raw-bytes 399, respectively.

FIG. 14 is a diagram of an encoded atom reference data structure. Each encoded-atom-references 398 is a block of bytes describing references from this atom 130 to other atoms 130. For example, if the atom 130 represents a procedure that calls another procedure, represented by another atom 130, the latter atom 130 would be described in the encoded-atom-references 398. This array of encoded-atom-references 398 is used by the atom management program 160 to link together atoms 130 as it loads them.

Atom-num-info 397 is the number of atom references encoded by the encoded-atom-references 398.

Each encoded-atom-reference 398 contains: an atom-ref-type 402, a source-offset-delta 404, a dest-offset 406 and a dest-atom-id 408.

Atom-ref-type 402 defines different types of references from an atom 130 to other atoms 130. Not all types will be used by all platforms. Valid atom-ref-types 402 include eager-absolute-32, eager-relative-32, lazy-absolute-code-32, lazy-relative-code-32, and lazy-absolute-32.

Eager-absolute-32 causes the atom management program 160 to load the referenced atom 130 immediately and store an absolute address to it.

Eager-relative-32 is similar to eager-absolute-32, but eager-relative-32 stores a relative offset to the referenced atom 130. Relative offsets are measured from the beginning of the reference.

Lazy-absolute-code-32 defines an absolute address (e.g., 32-bit) to an atom 130 containing code. It is "lazy" in that the referenced atom 130 is not actually loaded until it is first called. The atom management program 160 manages the delayed loading by setting up the reference to point to a code stub that lazily loads the referenced atom 130 the first time it is called.

Lazy-relative-code-32 is similar to lazy-absolute-code-32, but lazy-relative-code-32 stores a relative offset to the reference. Relative offsets are measured from the beginning of the reference.

Lazy, or load on demand, loading of data is provided implicitly by providing lazy loading of code and explicitly by encoding a referencing atom identifier such that the referenced data atom is not loaded until actually accessed at runtime. Since the loading of code that references data can be delayed until invoked, the data that the code references is likewise delayed—implicitly providing lazy loading of the data. Explicitly lazy data typically requires programmer support in order to mark the data to be lazily loaded (e.g., using compiler directives). In one embodiment, explicitly lazy data is referenced using a specific encoding algorithm that multiplies the referencing atom identifier by two and the increments the referencing atom identifier by one to produce a lazy data atom identifier.

Lazy-absolute-32 defines an absolute (e.g., 32-bit) address to another atom 130. It is "lazy" in that the referenced atom 130 is not actually explicitly loaded. Rather, the atom management program 160 links this reference by storing an encoded address (2* referenced atom id)+1. Note that this encoded address is always odd. Unlike lazy code references, which can use jump stubs, lazy data references require cooperation from the program the atom management program 160 is running. It has to check for odd pointer values and recognize that they are lazy data references. It then needs to load the desired atom 130 by calling back into the atom management program 160, and would typically overwrite the reference with a final address. Naturally lazily loaded data must be known to have even alignment, or an odd value for such a pointer will be ambiguous.

Source-offset-delta 404 specifies how many bytes into the atom 130 that a reference appears. This value is expressed as a delta from the end of the previous reference. The very first reference is encoded as if there were a previous reference ending at source-offset 0. References are always stored sorted by their source-offset, so the deltas in this array are always nonnegative. For example, if an atom 130 had four-byte references at byte offsets 0, 4, 8, 12, 20, the source-offset-delta fields for those references would be encoded as 0, 0, 0, 0, 4.

Dest-offset 406 encodes the offset of the number of bytes into the referenced (dest) atom 130 the reference points.

Dest-atom-id 408 is the atom id 132 for the atom 130 to which this reference points.

Encoded-raw-atom-bytes 399 is a block of bytes that represents atom bytes 134 for atom 130, with the space required to hold any references to other atoms 130 "spliced out", and with the remaining raw bytes compressed in a manner specified by the atom compression type. References within the atom bytes can be removed to create the raw bytes because encoded reference information contains a source offset (identifying where the reference is made), a destination id (identifying the target atom) and a destination offset (identifying how many bytes into the target atom the reference points). For example, if the atom bytes 134 represent a C string constant, this array would hold the sequence of characters in the string, possibly compressed. If instead the atom bytes 134 consist of four data bytes, followed by a four-byte reference to another atom 130, followed by eight more data bytes, the encoded-raw-atom-bytes 399 would contain just the twelve bytes of data, possibly compressed. The four byte reference will be "spliced in" to place during loading, making the fully-loaded atom bytes 134 take up 16 bytes.

Special-purpose atoms are defined by an atom-flag 396 containing a special-purpose identifier (e.g., its lower three bits set to the value "7"). The remaining bits of atom-flags 396 specify whether the special-purpose atom is a dll-ref-atom or a dll-atom.

Dll-ref-atoms comprise three fields: atom-flags, dll-atom-id and dll-symbol. Dll-ref-atoms correspond to symbols in external DLLs (such as an atom 130 for a library function such as printf( )). Those atoms 130 are represented as a pair of a DLL and a symbol to look up in that DLL. Dll-atom-id specifies the id of the dll-atom which specifies the DLL in which to look up the dll-symbol. Dll-symbol specifies which symbol to look up in the DLL.

Dll-atoms comprise an atom-flags field and a dll-path-name field. Dll-atoms are related to dll-ref-atoms and are used to specify the DLL in which a dll-ref-atom will be looking up a symbol. Dll-path-name specifies a pathname suitable for passing to dlopen, LoadLibrary, or equivalent function. It is stored as a C string (a sequence of bytes ending in 0).

Symbol-atom-map maps an atom id 132 to a textual symbol, by which the associated atom 130 can be accessed by name. Symbols are useful for referencing atoms 130 in a user-friendly manner. For example, when referring to an atom 130 with and atom identifier value of 57, it is easier for a programmer to reference the atom 130 by name (e.g., "printf"), than by its atom identifier value (e.g., "57").

Category-atom-map is an atom-map 360 from an atom id 132 to a textual category with no fixed semantics. Category-atom-maps allow for developer specific categorization of atoms. In other examples, categories can be used for tagging atoms 130 to identify character string atoms 130, identify atoms 130 for internationalization and for many other purposes.

Description-atom-map is an atom-map 360 from an atom id 132 to a textual description with no fixed semantics. Description-atom-maps can be used for storing debug information useful to developers when developing/debugging an atom-based system.

The reference type of an atom reference can be changed statically or dynamically, based upon profiling the usage of the reference. An atom reference 136 generally defaults to "lazy" in order to delay the loading of the actual atom bytes 134 until it is actually needed at runtime. "Eager" references cause the referenced data/code to be loaded when the calling atom 130 is loaded, regardless of whether or not it will actually be needed. Often the runtime code path executed within a given atom 130 at runtime will not execute all instructions within the atom 130. Loading uncalled or unreferenced atoms 130 can be wasteful of memory and processing resources.

Resolving lazy references for code includes pointing to a code stub that lazily loads the referenced atom 130 the first time it is called. Resolving lazy references for data includes storing the referenced atom id as a modified atom id defined as (2* referenced atom id)+1.

Once a lazy code reference is executed/accessed, an optimization can be done to avoid the indirection of using the code stub. The optimization includes "back-patching" the referencing code to directly reference the loaded atom 130. Back-patching replaces the use of the stub with a direct jump to the code atom 130 in memory. The back-patching can be done for the first actual caller and can also be applied to any loaded atoms 130 such that if and when the referenced atom 130 is actually called a direct jump can be made to it. The code stub can be left in memory for use by any atom for which back-patching was not done. Embodiments of the present invention provide for code atom 130 and data atom 130 references to be tagged to effect a particular loading action (e.g., lazy or eager) at the atom level.

Figure 15:
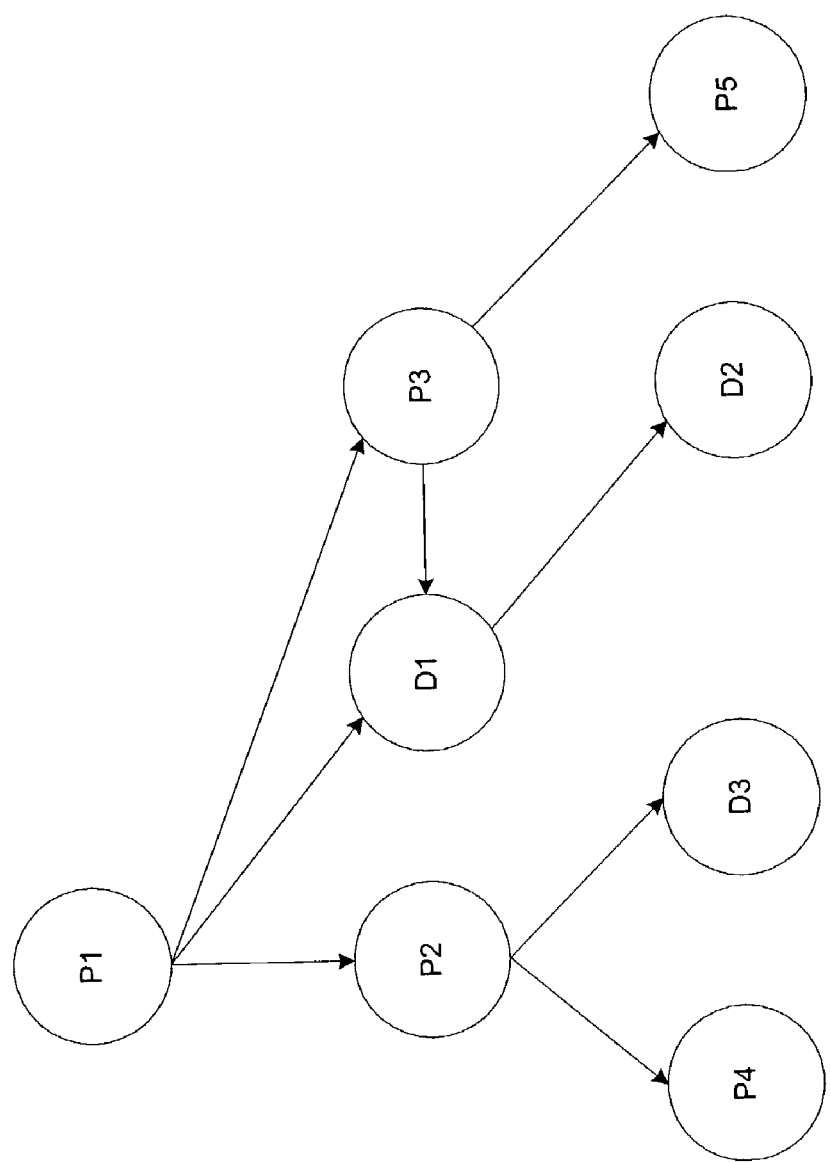
FIG. 15 is a diagram of an example system of four code procedures and three data elements.

FIG. 15 is a diagram of an example system of five code procedures and three data elements. In this example procedure P1 calls procedures P2 and P3, procedure P1 also accesses data element D1, which accesses data element D2. Procedure P2 calls procedure P4 and accesses data element D3. Procedure P3 accesses data element D1 and calls procedure P5. According to an embodiment of the present invention each code procedure {P1, P2, P3, P4, P5} is defined as a single individually addressable atom. Similarly, each data element {D1, D2, D3} is defined as a single individually addressable atom. At runtime, when P1 is loaded, D1 is loaded immediately, which causes D2 to be loaded. If the references to P2 and P3 are lazy, stubs will be created for P2 and P3, allowing for the actual loading of the code of the procedures to be deferred until a time if, and when, they are actually called. It is very possible that some code procedures (e.g., error handlers) will not be called during a normal execution path. In this case, processing and memory will be saved by delaying the loading. Implicit lazy loading of data (e.g., D3) based on lazy loading of code (e.g., P2) provides both processor and memory savings.

Data atom references can be encoded to provide a similar capability for data elements. Explicitly lazy loading of data can provide even more savings (e.g., loading of D3 can be delayed even after P2 is loaded).

By modifying the atom identifier of a referenced atom an atom management program 160 can delay the loading of a data element/atom until it is actually referenced. As with code atoms, it is very possible that some data atoms (e.g., error messages) will not be referenced during a normal execution path. Lazy/delayed loading of data atoms also saves processing and memory.

Conventional systems (e.g., Linux DLLs) provide code stubs, but these systems build stubs for all possible references at startup time. In contrast, embodiments of the present invention only build stubs for each atom 130 actually referenced by a loaded atom 130. Referring to FIG. 13, loading P1 will cause stubs for P2 and P3 to be created, but not for P4. Conventional systems typically load all data elements at startup. For example, in a conventional system, D1, D2 and D3 would all be loaded at startup. In contrast, embodiments of the present invention only load D3 when D2 is loaded, or only when D3 is actually used. The flexibility to treat data and code in a similar fashion with regard to loading provides many performance improvements. This is especially true of systems that have a relatively large ratio of data to code.

Figure 16A:
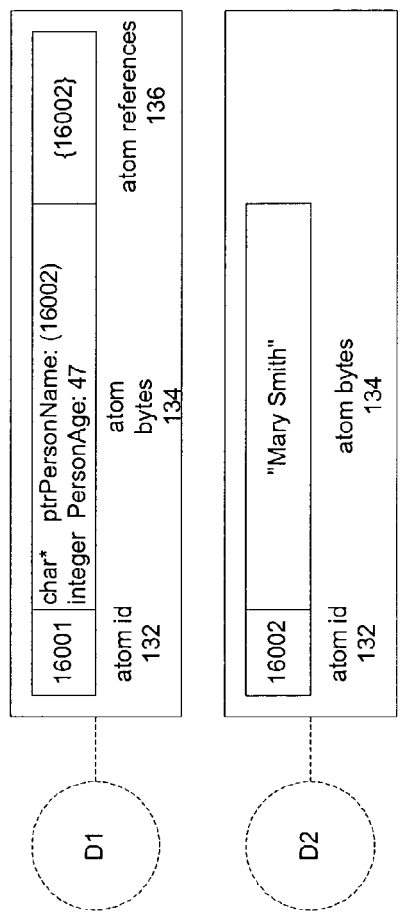
FIG. 16a is a diagram of example data atoms.

FIG. 16a is a diagram of example data atoms 130. The data atoms 130 are represented conceptually to exemplify their atom id 132, atom bytes 134 and atom references 136. Data atom 16001 (analogous to D1 in FIG. 15) contains two items of data (atom bytes 134): a reference (pointer) to a person's name (i.e., "Mary Smith") and an integer representing Mary's age (i.e., 47). The reference (atom reference 136) is a reference to atom 16002. Atom 16002 (analogous to D2 in FIG. 15) is a data atom 130 representing the character string "Mary Smith" (atom bytes 132), atom 16002 does not reference any other atoms.

Figure 16B:
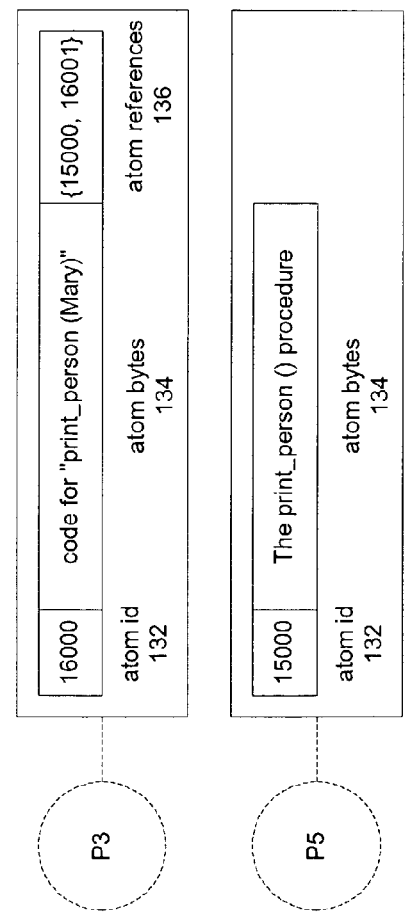
FIG. 16b is a diagram of example code atoms.

FIG. 16b is a diagram of example code atoms 130. The code atoms 130 are represented conceptually to exemplify their atom id 132, atom bytes 134 and atom references 136. Code atom 15000 (analogous to P5 in FIG. 15) represents executable code for a print_person( ) procedure, which prints a person's and age. Code atom 16000 (analogous to P3 in FIG. 15) represents a procedure which calls the print_person( ) procedure to print Mary's name and age. Code atom 16000 references the data for Mary by referencing the data atom 16001, and invokes the print_person( ) function through a reference to code atom 15000, print_person( ). Therefore, the atom represented by atom 16000 contains two atom references 136, a code atom reference 136 to atom 15000 (the code atom for the print_person( ) procedure) and a data atom reference 136 to atom 16001 (the data atom for Mary's data).

While this invention has been particularly shown and described with references to preferred embodiments thereof, it will be understood by those skilled in the art that various changes in form and details may be made therein without departing from the scope of the invention encompassed by the appended claims.

Specifically, an atom database 120 is described having a number of distinct sections, those skilled in the art will readily recognize that sections representing various uses of atoms 130 can be added or removed within the teachings of the present invention. Additionally, actual disk encoding schemes can vary within the teachings of the present invention.

Although embodiments of the present invention are appropriate for implementing a Curl™ runtime, nothing in the disclosure limits the use of the present invention to the Curl™ runtime. Embodiments of the present invention can be applied to any software program.

What is claimed is:

1. A method of loading atomized computer program code and data on demand, comprising:
    loading an atom from an atom database into a memory, the atom defining code or data in a fine-grained, individually addressable manner, the atom comprising:
        an atom identifier;
        computer program code or data information;
        computer program code or data reference information;
    modifying the computer program code or data information by transforming a referencing atom identifier, the referencing atom identifier identifying a referenced atom, into a memory address and encoding the memory address such that the referenced atom is not loaded until actually accessed at runtime; and
    reordering atoms in a disk-based atom database for efficient access based upon analyzing a runtime pattern of previous atom loading experiences.

2. The method of claim 1 wherein the memory address is a memory address of a stub routine that loads the referenced atom and jumps to the referenced atom.

3. The method of claim 2 wherein the memory address of the stub routine is overwritten by an updated memory address directly referencing the referenced atom.

4. The method of claim 2 wherein the memory address of the stub routine is overwritten for all loaded atoms referencing the referenced atom.

5. The method of claim 1 wherein the step of encoding comprises:
    multiplying the referencing atom identifier by two and incrementing the multiplied referencing atom identifier by one to produce a lazy data atom identifier.

6. The method of claim 1 further comprising the step of:
    updating at least one of the atoms in the atom database by replacing the computer program code or data information and the computer program code or data reference information.

7. The method of claim 1 further comprising the step of:
    adding a new atom to the atoms in the atom database.

8. The method of claim 1 further comprising the step of:
    deleting a selected atom from the atoms in the atom database.

9. The method of claim 1 wherein the loading step further comprises:
    decompressing the computer program code or data information stored in a compressed format.

10. The method of claim 1 wherein loaded atoms are removed from memory based upon a predetermined usage threshold.

11. The method of claim 1, further comprising:
    executing the loaded atom prior to loading all atoms referenced by the loaded atom.

12. The method of claim 1, further comprising
    determining a loading technique based upon analyzing a runtime pattern of previous atom loading experiences, wherein the loading technique includes one of an eager loading technique and a lazy loading technique; and
    modifying the computer program code or data reference information to utilize the determined loading technique.

13. The method of claim 1 wherein a loaded atom is shared between a plurality of executable processes by way of a read-only buffer.

14. A method for atomizing computer program code and data, comprising:
    receiving the computer program code and data in an object code format defining individually addressable code and data;
    extracting computer program code and data information from the computer program code and data in an object code format;
    extracting computer program code and data reference information from the computer program code and data in an object code format;
    modifying the computer program code and data reference information to use atom identifiers;
    storing the computer program code and data information and computer program code and data reference information in an atom comprising:
        an atom identifier;
        computer program code or data information; and
        computer program code or data reference information;
    reordering atoms in a disk-based atom database for efficient access based upon analyzing a runtime pattern of previous atom loading experiences; and
    modifying the computer program code or data information by transforming a referencing atom identifier, the referencing atom identifier identifying a referenced atom, into a memory address and encoding the memory address such that the referenced atom is not loaded until actually accessed at runtime.

15. An apparatus loading atomized computer program code and data on demand, comprising:
    an atom comprising:
        an atom identifier;
        computer program code or data information; and
        computer program code or data reference information; and
    an atom management program unit loading an atom from an atom database into a memory, the atom defining code or data in a fine-grained, individually addressable manner, modifying the computer program code or data information by transforming a referencing atom identifier, the referencing atom identifier identifying a referenced atom, into a memory address and encoding the memory address such that the referenced atom is not loaded until actually accessed at runtime, and reordering the atoms in a disk-based atom database for efficient access based upon analyzing a runtime pattern of previous atom loading experiences.

16. An apparatus atomizing computer program code and data, comprising:
    a receiver receiving the computer program code and data in an object code format defining individually addressable code and data;
    an extractor extracting computer program code and data information from the computer program code and data in an object code format, and extracting computer program code and data reference information from the computer program code and data in an object code format;
    a modifier modifying the computer program code and data reference information to use atom identifiers;

a storage unit storing the computer program code and data information and computer program code and data reference information in an atom comprising:
- an atom identifier;
- computer program code or data information; and
- computer program code or data reference information;

an optimizer for reordering the atoms in a disk-based atom database for efficient access based upon analyzing a runtime pattern of previous atom loading experiences; and an identifier transformer for modifying the computer program code or data information by transforming a referencing atom identifier, the referencing atom identifier identifying a referenced atom, into a memory address and encoding the memory address such that the referenced atom is not loaded until actually accessed at runtime.

17. An apparatus loading atomized computer program code and data on demand, comprising:

a means for loading an atom from an atom database into a memory, the atom defining code or data in a fine-grained, individually addressable manner, the atom comprising:
- an atom identifier;
- computer program code or data information;
- computer program code or data reference information;

a means for modifying the computer program code or data information by transforming a referencing atom identifier, the referencing atom identifier identifying a referenced atom, into a memory address and encoding the memory address such that the referenced atom is not loaded until actually accessed at runtime; and a means for reordering the atoms in a disk-based atom database for efficient access based upon analyzing a runtime pattern of previous atom loading experiences.

18. An apparatus atomizing computer program code and data, comprising:

a means for receiving the computer program code and data in an object code format defining individually addressable code and data;

a means for extracting computer program code and data information from the computer program code and data in an object code format;

a means for extracting computer program code and data reference information from the computer program code and data in an object code format;

a means for modifying the computer program code and data reference information to use atom identifiers;

a means for storing the computer program code and data information and computer program code and data reference information in an atom comprising:
- an atom identifier;
- computer program code or data information; and
- computer program code or data reference information;

a means for reordering the atoms in a disk-based atom database for efficient access based upon analyzing a runtime pattern of previous atom loading experiences; and a means for modifying the computer program code or data information by transforming a referencing atom identifier, the referencing atom identifier identifying a referenced atom, into a memory address and encoding the memory address such that the referenced atom is not loaded until actually accessed at runtime.

19. A computer program product comprising:

a computer readable medium for loading atomized computer program code and data on demand;

a set of computer program instructions stored on the computer readable medium, including instructions to:
- load an atom from an atom database into a memory, the atom defining code or data in a fine-grained, individually addressable manner, the atom comprising:
  - an atom identifier;
  - computer program code or data information;
  - computer program code or data reference information;
- modify the computer program code or data information by transforming a referencing atom identifier, the referencing atom identifier identifying a referenced atom, into a memory address and to encode the memory address such that the referenced atom is not loaded until actually accessed at runtime; and
- reorder the atoms in a disk-based atom database for efficient access based upon analysis of a runtime pattern of previous atom loading experiences.

20. A computer program product comprising:

a computer readable medium for atomizing computer program code and data;

a set of computer program instructions stored on the computer readable medium, including instructions to:
- receive the computer program code and data in an object code format defining individually addressable code and data;
- extract computer program code and data information from the computer program code and data in an object code format;
- extract computer program code and data reference information from the computer program code and data in an object code format;
- modify the computer program code and data reference information to use atom identifiers, wherein each of the atom identifiers identifies a referenced atom;
- store the computer program code and data information and computer program code and data reference information in an atom comprising:
  - an atom identifier;
  - computer program code or data information; and
  - computer program code or data reference information;
- reorder the atoms in a disk-based atom database for efficient access based upon analyzing a runtime pattern of previous atom loading experiences; and
- modify the computer program code or data information by transforming a referencing atom identifier, the referencing atom identifier identifying a referenced atom, into a memory address and encoding the memory address such that the referenced atom is not loaded until actually accessed at runtime.

* * * * *